(12) United States Patent
Geiger

(10) Patent No.: US 7,678,307 B1
(45) Date of Patent: Mar. 16, 2010

(54) VORTEX CONTROL IN SLURRY MOLDING APPLICATIONS

(75) Inventor: Ervin Geiger, Columbia City, IN (US)

(73) Assignee: Materials Innovation Technologies, LLC, Fletcher, NC (US)

( * ) Notice: Subject to any disclaimer, the term of this patent is extended or adjusted under 35 U.S.C. 154(b) by 580 days.

(21) Appl. No.: 11/592,660

(22) Filed: Nov. 3, 2006

Related U.S. Application Data

(63) Continuation-in-part of application No. 11/106,096, filed on Apr. 14, 2005.

(60) Provisional application No. 60/562,015, filed on Apr. 14, 2004.

(51) Int. Cl.
B29B 1/26 (2006.01)
D21F 13/00 (2006.01)

(52) U.S. Cl. .......................... 264/87; 162/218; 425/272

(58) Field of Classification Search ................... 264/87; 162/218; 425/272
See application file for complete search history.

(56) References Cited

U.S. PATENT DOCUMENTS

| | | | |
|---|---|---|---|
| 2,704,993 A | 3/1955 | Davis | 425/272 |
| 2,731,668 A | 1/1956 | Miner | 425/272 |
| 3,117,341 A | 1/1964 | Abildgaard | 264/303 |
| 3,128,932 A | 4/1964 | Reifers | 229/2.5 |
| 3,275,213 A | 9/1966 | Reifers | 229/2.5 |
| 3,590,905 A | 7/1971 | Watts | 164/165 |
| 3,850,793 A | 11/1974 | Hornbostel et al. | 162/391 |
| 4,160,003 A | 7/1979 | Kozuka et al. | 264/87 |
| 4,162,935 A | 7/1979 | Kollmann et al. | 162/220 |
| 5,039,465 A | 8/1991 | Freeman et al. | 264/86 |
| 5,190,991 A * | 3/1993 | Parker et al. | 523/149 |
| 5,314,653 A | 5/1994 | Haralambopoulos | 264/301 |
| 5,466,142 A | 11/1995 | Miani | 425/131.5 |
| 5,487,863 A | 1/1996 | Cunningham et al. | 264/177.11 |
| 5,497,886 A * | 3/1996 | Young et al. | 209/270 |
| 5,562,930 A | 10/1996 | Hills | 425/198 |
| 5,656,135 A | 8/1997 | Baker | 162/388 |
| 5,928,829 A | 7/1999 | Cheng et al. | 430/137.12 |
| 6,015,513 A | 1/2000 | Sheffler et al. | 264/37.18 |
| 6,086,720 A | 7/2000 | Bodary et al. | 162/382 |
| 6,103,179 A | 8/2000 | Larsson | 264/489 |
| 6,248,417 B1 | 6/2001 | Ponsolle et al. | 428/66.2 |
| 6,291,552 B1 | 9/2001 | Dong | 523/217 |
| 6,344,163 B1 | 2/2002 | Ashley | 264/310 |
| 6,409,885 B1 * | 6/2002 | Smit et al. | 162/382 |
| 6,488,811 B1 | 12/2002 | Dong | 162/145 |
| 6,673,288 B2 | 1/2004 | Dargavell et al. | 264/102 |
| 6,716,319 B2 | 4/2004 | Gale et al. | 162/391 |
| 2001/0009313 A1 | 7/2001 | McClure et al. | 264/316 |
| 2004/0004308 A1 | 1/2004 | Schuessler | 264/310 |
| 2005/0045529 A1 * | 3/2005 | Meese et al. | 209/273 |
| 2008/0156576 A1 | 7/2008 | Suzuki et al. | 181/148 |

* cited by examiner

*Primary Examiner*—Joseph S Del Sole
*Assistant Examiner*—Jeremiah Smith
(74) *Attorney, Agent, or Firm*—Joseph T. Guy; Nexsen Pruet, LLC

(57) ABSTRACT

A molding head is especially adapted for vacuum molding or forming of structures and, in particular, fibrous composite structures in an adjustable, controllable three dimensional orientation before, during and after molding. Such a molding head includes a mold plate with narrow slots in the mold surface thereof and wider channels in the back surface thereof, with such slots and channels intersecting one another. A control system of servomotors or other actuators permits movement and orientation of the mold head during forming, thereby creating the ability to vary the material properties based on gravity and particle or suspension grain, thickness and other now controllable properties.

9 Claims, 4 Drawing Sheets

VORTEX CONTROL IN SLURRY MOLDING APPLICATIONS

CROSS REFERENCES TO RELATED APPLICATIONS

This application is a continuation in part of pending U.S. patent application Ser. No. 11/106,096 filed Apr. 14, 2005 which, in turn, claims priority under 35 U.S.C. 109(e) from U.S. Provisional Patent application Ser. No. 60/562,015 filed Apr. 14, 2004, both of which are incorporated herein by reference.

BACKGROUND OF THE INVENTION

1. Field of the Invention

The present invention relates generally to a process for molding or forming items from pulp, slurries, or other suspensions and products obtained thereby. The vacuum mold head or mold plate in the apparatus is given the ability to be located in various orientations within the material holding tank, thereby creating the ability to control the vortex created during the molding process. By controlling the vortex the material properties can be controlled, particularly, when utilizing slurries with low solids concentrations.

2. Related Art

The forming process of items, particularly those formed from solutions of pulps, slurries or suspensions have, up to now, never had a way to control the direction of gravity during the forming process. In the prior art, once the mold was set up, the direction of gravity was fixed relative to the mold. Gravity effects on the suspended particles in the suspensions would, during the forming process, sometimes cause non-Page uniform surface effects in the formed piece. What is needed in the art is a mechanism to control the orientation of the vacuum mold head relative to gravity.

The use of a vacuum mold head is well known in the art. In co-pending U.S. patent application Ser. No. 11/106,096 a device with an articulating, or gambrel, arm is described along with the ability to control the orientation of the vacuum mold head relative to gravity. This advance in the mechanism has led to further understanding in the dynamics of fiber deposition and allowed further advances in the properties which can be obtained.

Through diligent research it has now been realized that fibers can be selectively oriented by controlling the motion of the vacuum mold head to increase the physical strength of the final product.

Vacuum forming techniques are characterized by the use of a mold head which has a vacuum, or suction, applied to one side of the mold head. The mold head is lowered into a slurry of fibers. As the slurry is drawn through the mold head the fibers deposit thereby forming the preform by depletion of the solids in the slurry. The solvent, typically with some concentration of fibers, passes through the filter and is either discarded or recycled. It is widely known that the slurry tends to form a vortex due to the act of drawing the slurry through a void. In extreme cases when the fiber, or solids content is very low, the vortex is approximately centrally located over the vacuum port. In many cases the impact of the vortex can be measured as variations in thickness from the center of the vortex outward. There have been many attempts to alleviate this problem by techniques such as varying the sizes of the voids, using baffles in the slurry, introducing air flow into the slurry to disrupt the local flow and other techniques. These techniques are insufficient and difficult to set up. Baffles, for example, are widely used. The location of the baffles is typically done by trial and error which requires a substantial amount of effort. If the product is changed the baffling must also be changed in ways which are not easily predicted. This leads to wasted time and effort and makes it difficult to quickly change from one product to another. Furthermore, the baffles are typically fixed relative to the tank, and within the solution, which limits changes during the fiber deposition process.

Even with the best efforts current techniques are not sufficient and tend to be counterproductive by slowing the formation process. Depending on the shape and design of the mold head the vortex formation can be localized with a vortex for each void or it can be larger with a vortex covering larger areas of the filter. The vortex causes fibers to congregate and at least partially align approximately tangentially to the vortex within the slurry. This tangential alignment of fiber or solids may be used to increase the preform thickness in desired areas without baffling which tends to slow the formation process. As the fibers reach the filter there is, at least, localized fiber orientation or alignment. As would be realized fibers which are parallel and overlaid do not form a strong matrix and must be cross-linked, or cured, to represent a rigid structure.

Through diligent research the present inventor has developed a process for slurry molding applications which can disrupt localized fiber alignment with minimal efforts and without reliance on baffles or flow control techniques. Furthermore, the disruption provides a product hypothesized to have fibers oriented in a manner which approaches randomness and which are interlaced resulting in significant increases in strength relative to conventionally formed slurry molded products.

SUMMARY OF THE INVENTION

The present invention includes a molding head process especially adapted for vacuum molding or forming of structures and, in particular, fibrous or particulate composite structures wherein the fibers are randomly oriented thereby providing a stronger matrix.

Yet another advantage of the present invention is that the invention can be used in conjunction with a pulp molding/die-dried process. One such procedure can be felting or molding a blank from a fibrous suspension using the mold head.

An advantage stemming from the ability to manipulate fiber or molded part orientation is that a multi-layer component can be developed in which fibers are oriented in each layer so as to promote drainage therethrough and/or to achieve a desired set of product characteristics.

Yet another advantage of the present invention is the ability to provide a multi-layered composite of differing materials accurately and under sufficient control to quickly and economically provide novel structures or conventional structures with improved properties.

Yet another advantage of the present invention is that a wide range of composite/homogeneous structures can be formed of any of various sizes, shapes, and/or compositions.

These and other advantages, as will be realized, are provided in a molding system. The molding system has a container for holding material to be molded. A mold head is provided on which material is be molded. At least one arm is attached to the mold head and capable of moving the mold head in three-dimensions within the container.

Yet another embodiment is provided in a process for forming a molded part. The process includes providing a container for holding a material to be molded. The molding head is placed into the material wherein the molding head has passages there through. A reduced pressure is applied to the molding head to draw material through the passages. The molding head is moved in three dimensions within the material and a molded part is formed on the molding head.

Yet another embodiment is provided in a molded part formed by the process of:

providing a container for holding a material to be molded;

placing a molding head into the material wherein the molding head comprises passages there through;

applying a reduced pressure to the molding head to draw material through the passages;

moving the molded part in three dimensions within the material; and forming the molded part on the molding head.

Yet another embodiment is provided in a process for forming a molded part. The process includes providing a container for holding a material to be molded. The mold head is preferably equipped with vortex generators, or fences, to expand or intensify the vortex spin and may be mounted above or below the mold screen media. The molding head is placed into the material wherein the molding head has passages there through. A reduced pressure is applied to the molding head to draw material through the passages, vortex generators and/or fences. By combining the generated vortex's and the three dimensional movement of the mold head as the material is drawn onto, or repelled from, the mold screen media used on the mold head to form a part.

BRIEF DESCRIPTION OF THE DRAWINGS

The features and advantages of this invention, and the manner of attaining them, will become more apparent and the invention will be better understood by reference to the following descriptions of the embodiments of the invention taken in conjunction with the accompanying drawings.

The exemplifications set out herein illustrate at least one preferred embodiment of the invention, in one form, and such exemplifications are not to be construed as limiting the scope of the invention in any manner.

DETAILED DESCRIPTION OF THE INVENTION

Figure 1:
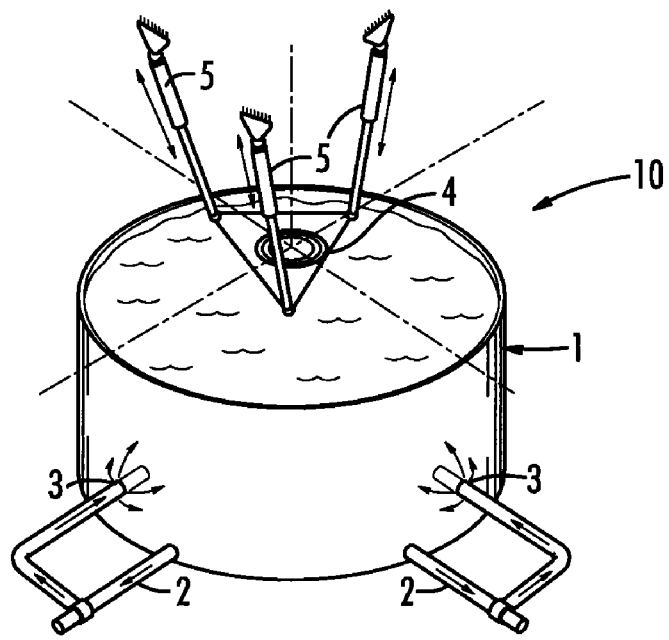
FIG. 1 is an diagrammatic perspective view of the molding system of one embodiment the present invention.
Figure 2:
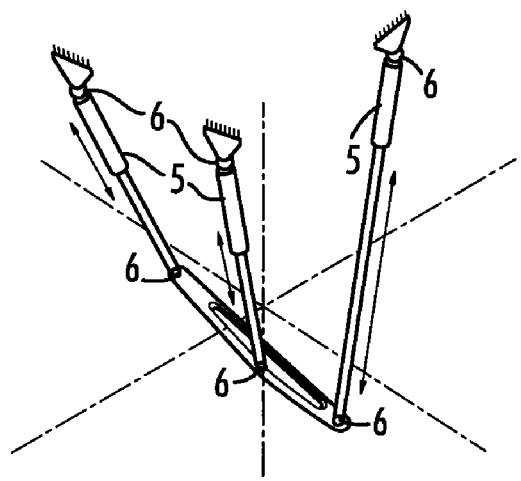
FIG. 2 is a diagrammatic perspective, partially cut-away view of the mold head of FIG. 1, shown in an alternate orientation.
Figure 3:
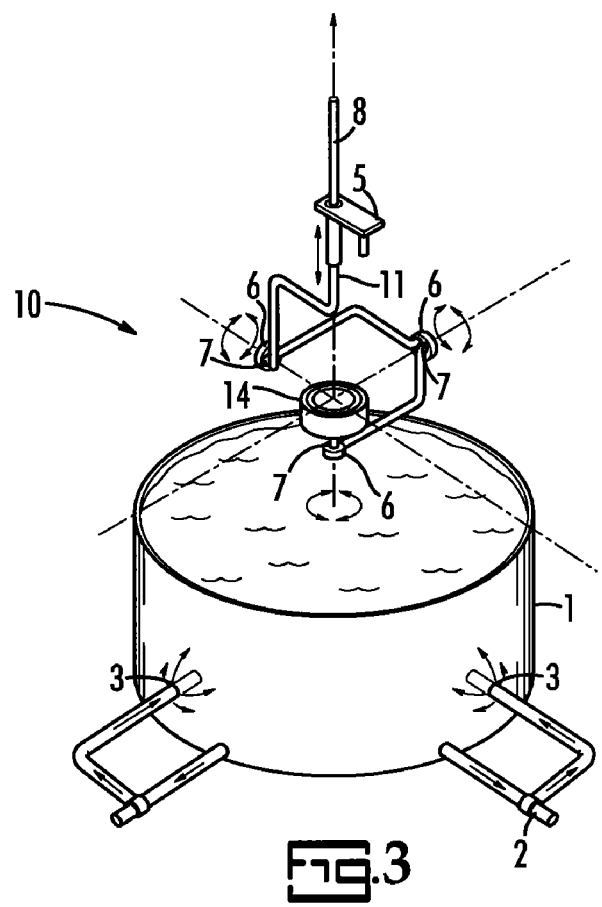
FIG. 3 is a diagrammatic perspective view of an alternate embodiment of the molding system for producing various size and shape molded articles showing an alternate system of controlling the three dimensional orientation of the mold head.

A molding system 10 of the present invention is illustrated in FIGS. 1, 2 and 3. The molding system, 10, includes a mold head 4 (FIGS. 1-2) or 14 (FIG. 3). Molding heads can be manufactured from materials common in the art including, but not limited to, steel, aluminum, brass, stainless steel and composites.

Mold head 4, 14 is located in three dimensional space by at least one arm 5 (FIGS. 1-2) comprised of linear servos or other manually or computer controllable actuating systems, that can fix and or relocate the three dimensional position of mold head 4, 14 during molding within a tank 1 of slurry, pulp, or other suspension. Tank 1 is supplied with an agitation system 2 to continuously and substantially completely maintain the homogeneity of the pulp, slurry or suspension within tank 1 used as the constituent material for the molded article to be formed on head 4, 14. In one embodiment the agitation system comprises a rotatable nozzle, 3, which recirculates solution within the tank by a pressurized flow. The agitation system can be a rotatable nozzle, a mixer blade or an air bubbler. Rotatable nozzles and mixer blades are preferable for easily suspended materials and an air bubbler is preferable for materials that are difficult to suspend in a slurry.

The mold head preferably has vacuum or suction ports for providing a reduced pressure thereby drawing the molding liquid through the mold head while depositing suspended fibers on the mold head. The vacuum ports may have channels or slots and may be arranged co-parallel or nearly so to each other to promote uniform fluid flow through the mold face. Yet it may prove advantageous to arrange the slots in any of a variety of patterns, for example: a star-shape, a series of concentric circles, a spiral-shape, a series of nested polygons, or potentially a non-regular pattern. The collection of vacuum ports is also referred to as a mold screen. Any of these or other patterns may be chosen to achieve a desired fluid flow for mold head 4, 14. While in most instances a uniform fluid flow will be desired, there may be instances in which a controlled non-uniformed fluid flow is desired to thereby specifically create variances in the surface of the part, or preform, being formed. No matter the pattern, it is generally preferable that slots be made as narrow as possible yet still able to sufficiently vent steam and/or drain the fluid (i.e., liquid or gas) portion of the molding suspension there through.

The molding system 10 is advantageously used as part of a molding arrangement system which further incorporates a vacuum device (8, FIG. 3). Vacuum device 8, as illustrated in FIG. 3, is connected to and may include a vacuum mold head 14, and a plurality of vacuum conduits 11, interconnected for relative articulation by rotary unions 7, allowing movement with three degrees of freedom of mold head 14 relative to gravity. Located at each rotary union 7 are servos 6 or other devices to accurately control the positioning of the conduits 11, which would necessarily then control the placement and orientation of mold head 14 in three dimensional space relative to tank 1, agitator, 3, and gravity. A servo mechanism 5 connected to vacuum device, 8, permits the assembly to be removed from the liquid or source material of tank 1 when necessary.

It is advantageous for vacuum device, 8, to be adjustable with regards to the internal pressure and relative position.

The embodiments of molding arrangement shown in FIGS. 1-2 illustrate the variety of complex orientations, which may be utilized in the mold or forming process of the invention. As can be seen from FIGS. 1 and 2, mold head 4 can be developed for movement or controlled orientation within tank 1, thereby causing formation of thicker, shaped pieces or for molding thin fragile parts, or in all cases controlling the settling of movement of the material from suspension onto the mold forming head. By changing the effective length of arms 5, the head location may be changed before, during or after molding.

FIG. 3 illustrates a system designed for locating the mold head, 14, within the tank, 1, during the forming process, preferably, while applying vacuum or suction through mold head, 14, causing articles in suspension to build in thickness on the surface of the mold head. In the embodiment of FIG. 3, servos 6 change relative locations between vacuum conduits 11, which therefore change the location of mold head, 14, within and relative to tank 1, the suspension therein, and most importantly gravity.

Figure 4:
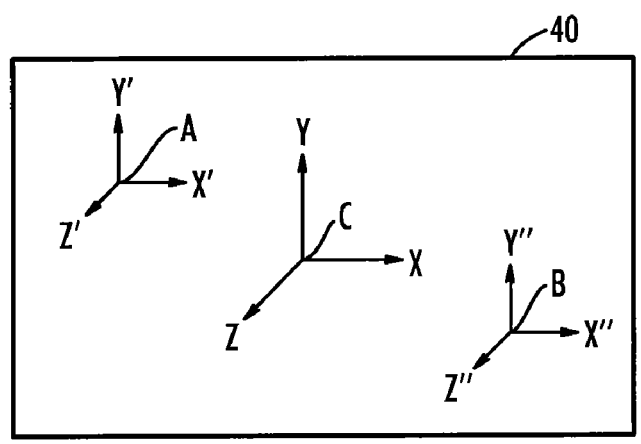
FIG. 4 is a diagrammatic representation of an advantage of the present invention.

A particular advantage of the present invention is described schematically with reference to FIG. 4. In FIG. 4 a mold head is illustrated schematically at 40. Imposed on the mold head is a series of orthogonal axis with the y-axis being perpendicular to the page and the x-axis and z-axis being coplanar and in the plane of the page. The orientation of the orthogonal axis system is by convention and any axis system could be used to describe the motion. For the purposes of discussion the primary axis system has an origin at the approximate center (C) of the mold head while two secondary axis systems are at arbitrary points (A) and (B).

It has long been the practice in mold forming to have an appropriately shaped mold which is lowered into a slurry. For the purposes of the present invention this corresponds to movement along the Y-axis. In some applications, such as the manufacture of paper, the mold form is withdrawn from the solution and then translated back-and-forth within the plane of the mold to allow fibers to orient in parallel fashion.

Through diligent research it has been surprisingly realized that providing a third degree of motion within the slurry allows the fiber distribution to be more carefully controlled by altering the vortices in the slurry. It has long been the approach to alter the vortex by controlling the flow of the slurry.

By way of explanation, again with reference to FIG. 4, the mold head, 40, can be lowered into the slurry and moved in various random directions thereby insuring that the flow dynamics on the face of the mold head vary with time during the fiber deposition process. The ability to translate the mold head in three dimensions also allows fiber buildup to be varied. By way of explanation, if the mold head is rotated approximately around the center point (C) the arbitrary point (A) can move through the slurry at a different rate than arbitrary point (B). The net effect is a fiber accumulation at arbitrary point (A) that is different from that at point (B). The difference in fiber accumulation is a function of rotation rate, solids content and solution rheology. By comparison with the prior art this type of variation would require baffling to alter the fiber deposition over arbitrary point (A) relative to the fiber deposition over arbitrary point (B). The baffling disrupts the overall flow in the tank which is detrimental to homogeneity of the slurry. By selectively controlling the movement of the mold head the homogeneity of the slurry can be maintained throughout the tank while certain regions of the mold head can be accelerated, or decelerated through the slurry as desired.

It is well within the scope of the present invention to create a molding arrangement for forming cylinders, domes, or other complex convoluted or irregular shapes, including, parts with raised portions and/or valleys/grooves. As a result, it is possible to use the molding arrangements system to create any of a variety of preform components including, but not limited to audio speakers, composite parts, multi-layer parts and the like. Even more particularly complex items formed from carbon fibers, KEVLAR® (para-aramid) fibers or other items pulled out of suspension and formed, molded or laid-up on head 4, 14 can be formed.

The molding procedure can, more particularly, be used with respect to two procedures associated with pulp molding. The first procedure is the felting of a paper/pulp blank where the mold head 4, 14 is covered with a suspension made up of wood pulp, a synthetic blend of fibers, carbon fibers, fiberglass, ceramic fibers, ceramic fiber precursors and/or other types of fibers along with water and/or another suspension fluid (e.g., another liquid or, potentially, a gas). The fibers can be straight fibers, fibrillated fibers or flocked fibers. It is also to be understood that such a suspension may also include, for example, chemicals (such as dispersants) which contribute to the suspension chemistry and/or ingredients such as binders which aid characteristics of the formed felted blank or preform.

Upon covering the mold head 4, 14 with the desired suspension, a vacuum is applied to the mold head via vacuum device, 8, or conduits, 11, in order to draw the water and/or other carrying medium from the suspension, thereby resulting in the formation of a felt-like preform or material thickness on the mold surface. The mold head 4, 14 is then removed from the suspension, and the remaining water/suspension medium is pulled from the blank via the vacuum to thereby produce a preform of a preset dryness. During the molding operation, the orientation of the mold head 4, 14 may or may not be changed in relative three dimensions within tank 1, which could lead to different material properties (e.g. thickness), among other things.

The suspension formulation used to achieve the desired product is chosen so as to get the desired suspension chemistry and rheology needed to achieve a substantially uniform distribution of the fibers both in suspension and upon precipitation thereof in such a manner so as to produce an acceptable preform in a timely fashion. Such factors as fiber material, sizing, and sizing distribution; base suspension composition and viscosity; mold shape and configuration; and vacuum characteristics can affect the generation of the product.

Alternatively, the molding system, 10, can be used to create a green-state near-net shaped product. This green-state product would typically be a ceramic/ceramic, ceramic/glass, metal/ceramic, or powdered metal or ceramic, advantageously held together by a temporary binder. As a green-state product, the product generally has enough strength to be handled but requires a further thermal processing step in order to achieve full strength and/or other (e.g., thermal, electrical, optical) capabilities. The use of a curing oven may be useful in improving the intermediate strength of the green-state product if a heat-curable resin is used as a temporary binder material in the product. In any event, the completed part, if it is a green-state near-net shaped product upon completion, will then need to be fired/sintered to produce the final usable product.

Figure 5:
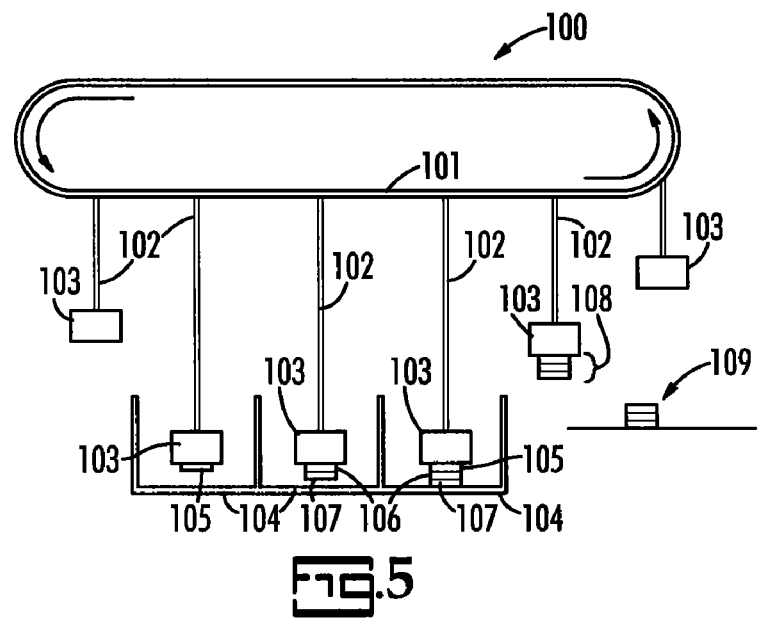
FIG. 5 is a schematic diagram of a device for formation of multi-layered products.

Multi-layer products can be produced using the present invention to thereby achieve the desired characteristics. In such layers, the orientation of layers and mold and part formed, composition, and/or particle/fiber size distribution, by way of example only, can be varied for each of the layers. With reference to FIG. 5, multi-layer device, generally represented at 100, is illustrated schematically. The multi-layer device may comprise a transporter, 101, in the form of a conveyor, gantry or the like illustrated as a loop for convenience. The transporter may have associated therewith at least one transport arm, 102, wherein each transport arm comprises a mold head, 103. The transport arm, 102, sequentially lowers the mold head, 103, into at least one of a series of tanks, 104, three of which are shown for convenience without limit thereto. The mold head is moved within the tank as described elsewhere and the pressure is reduced through vacuum ports, 104, herein until a first product layer, 105, is formed thereon. Similarly, a second product layer, 106, and third product layer, 107 are formed and the mold head is removed with a multi-layer precursor, 108, adhered thereto. The multi-layer product may be further processes, such as by drying, and removed from the mold head to form a multi-layered product, 109. The mold head may then be reused. The transport arm, 102, would allow the movement of the mold head into and within the tank and provide a vacuum to the mold head as would be realized from the disclosure herein. While illustrated as a continuous process with multiple tanks and multiple transport arms, the invention can be demonstrated and is contemplated to be accomplished with a single tank which is emptied and recharged. The product layers may be the same or different.

Figure 6:
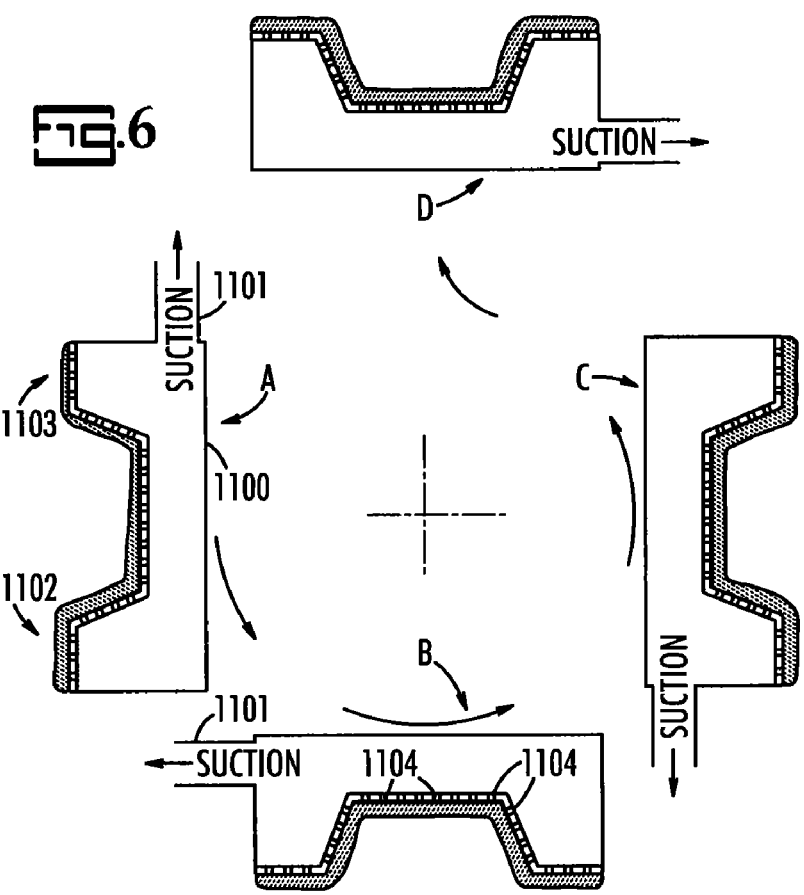
FIG. 6 is a schematic illustration of an embodiment of the present invention.

A process for forming a preform is illustrated with reference to FIG. 6. In FIG. 6, mold head, 1100, with a vacuum ports, 1104, and vacuum connection, 1101, is moved through a slurry in the direction of the arrows. At the first position, illustrated at A, the fiber buildup is higher at the leading edge, 1102, than at the trailing edge, 1103. At position B the mold head is inverted which alters the deposition rate of fibers. At position C the previously deposited material alters the apparent vacuum at the surface thereby altering the deposition of fibers. By altering the movement, and vacuum level the characteristics of the preform can be altered to accommodate the necessity for the product. Also, by continually moving the mold head the fibers can be intertwined to provide a preform of increased strength relative to prior art techniques.

Figure 7:
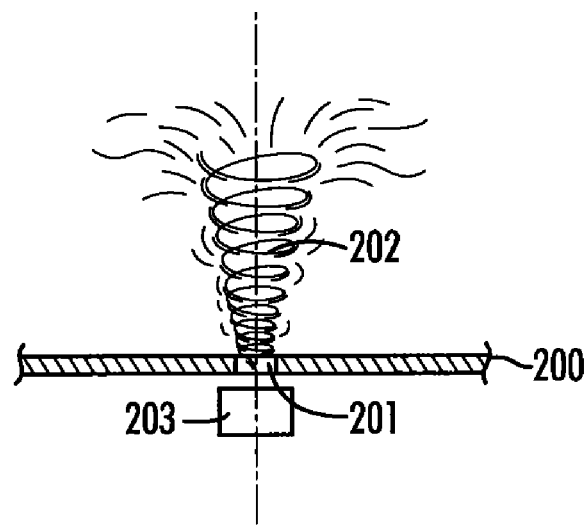
FIGS. 7 and 8 are schematic representations of the mechanism of the present invention.
Figure 8:
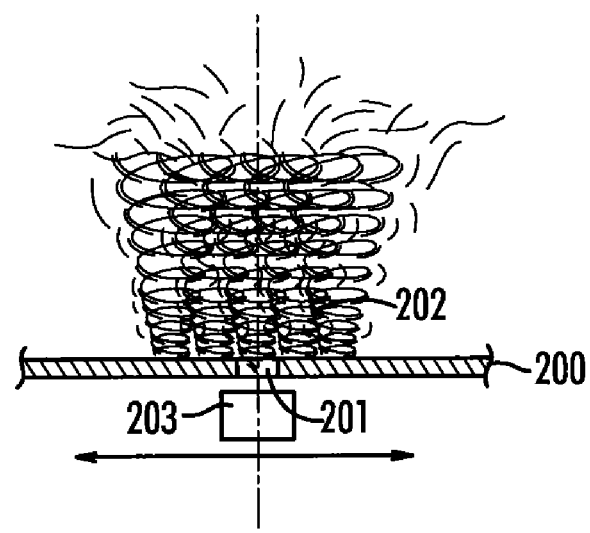

While not restricted to any theory, the proposed mechanism of the invention will be described with reference to FIGS. 7 and 8. FIG. 7 illustrates a static deposition of fibers wherein the mold head, 200, comprises a vacuum port, 201 through which a reduced pressure reduction is applied. The mold head may also comprise a vortex generator or fence represented schematically at 203 to expand or intensify the formation of the vortex. The fibers, 202, align in tangential relationship to the vortex, as illustrated, and deposit in that manner. As realized through diligent research this forms a preform with limited strength. FIG. 8 illustrates schematically the impact of movement of the mold head. As the mold head moves, illustrated by the arrow, the vortex is realigned thereby causing the fibers to become dispersed and to be deposited in an orientation which is no longer aligned. The fibers become randomly oriented which increases the number of fibers each fiber is in contact with similar to a woven pattern. This random orientation greatly increases the strength of the preform. If the mold head is moved in a manner which is not perpendicular to the vortex, as illustrated in FIG. 6 for example, the vortex is further disrupted and fiber deposition is further randomized.

As can be seen from the description, and particularly FIGS. 7 and 8 the process includes providing a container for holding a material to be molded. The mold head is preferably equipped with vortex generators, or fences, to expand or intensify the vortex spin and may be mounted above or below the mold screen media. The molding head is placed into the material wherein the molding head has passages there through. A reduced pressure is applied to the molding head to draw material through the passages, vortex generators and/or fences. By combining the generated vortex's and the three dimensional movement of the mold head as the material is drawn onto, or repelled from, the mold screen media used on the mold head to form a part.

Example 1

A carbon fiber solution comprising 35.4 mm (1 inch) carbon fibers obtained from Toho Tenax Co. was suspended in an aqueous solution at 0.08 wt % fiber. The carbon fiber solution was placed in a tank. A 355.6×355.6 mm (14"×14") flat text plaque mold head was lowered into the tank until completely submerged in the carbon fiber solution and rotated less than 45° about its central axis into the flow stream over a time span of about 18-30 seconds with a vacuum applied to the mold head. The mold head was removed from the solution, the deposited carbon fibers were dried and observed. The carbon fiber built up on the trailing edge of the mold head was about twice as thick as the carbon fiber built up on the leading edge. The fibers were approximately aligned and the deposit was easily peeled in sheet form.

Example 2

A carbon fiber solution was prepared as in EXAMPLE 1. The mold head described in EXAMPLE 1 was lowered into the tank and completely submerged, as in EXAMPLE 1. Unlike EXAMPLE 1 the mold head was rotated and oscillated until the amount of fiber deposited was approximately equal to that of EXAMPLE 1. The mold head was removed from the solution, the deposited carbon fibers were dried and observed. The carbon fiber build up was more evenly distributed and more randomly oriented and the fibers were difficult to separate relative to EXAMPLE 1.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A process for forming a molded part comprising:
   providing a container for holding a material to be molded;
   placing a mold head into said material wherein said mold head has at least one element selected from a vortex generator and a fence to expand or intensify vortex spin and said molding head has a mold screen thereon;
   applying a reduced pressure to said molding head to draw said material through said mold head to form a vortex; and
   moving said mold head with three degrees of freedom thereby selectively altering said vortex to drawn said material onto, or repel said material from, said mold screen.

2. The process for forming a molded part of claim 1 wherein said material is at least one of a pulp, slurry or suspension mixture.

3. The process for forming a molded part of claim 1 wherein said material comprises a fiber.

4. The process for forming a molded part of claim 3 wherein said fiber comprises at least one fiber selected from carbon fibers, para-aramid fiber, fiberglass, ceramic fibers, ceramic fiber precursors.

5. The process for forming a molded part of claim 1 in which said reduced pressure is provided by a pressure reduction device which includes at least one rotary union, such that vacuum pressure may be applied to said mold head while said mold head is in different positions within said container.

6. The process for forming a molded part of claim 5 wherein said pressure reduction device varies the vacuum pressure applied to said mold head during the molding operation.

7. The process for forming a molded part of claim 1 further comprising servos for moving said mold head.

8. The process for forming a molded part of claim 7 further comprising linear servos for moving said mold head within said container.

9. The process for forming a molded part of claim 1 wherein said material drawn through said mold head forms said vortex perpendicular to a portion of said mold head and said portion of said mold head is movable in a direction which is not perpendicular to said vortex.

\* \* \* \* \*